March 1, 1960 O. JENSEN 2,927,143
MECHANICAL RECTIFIER FOR ARC FURNACE
Filed Sept. 18, 1957 3 Sheets-Sheet 1

INVENTOR.
OTTO JENSEN
BY Ostrolenk, Faber, Gerb & Soffen
ATTORNEYS

March 1, 1960
O. JENSEN
2,927,143
MECHANICAL RECTIFIER FOR ARC FURNACE
Filed Sept. 18, 1957
3 Sheets-Sheet 2
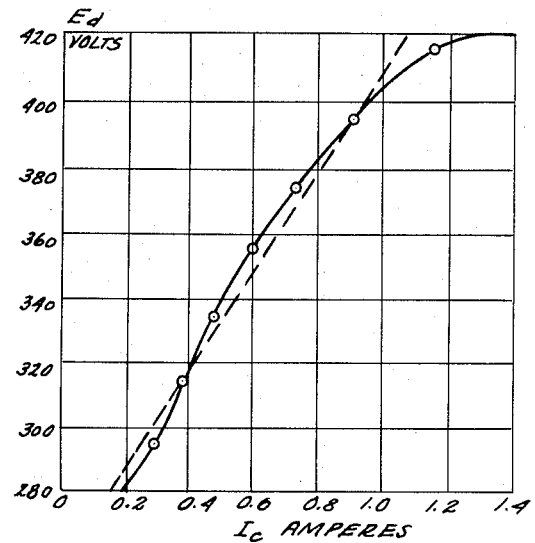
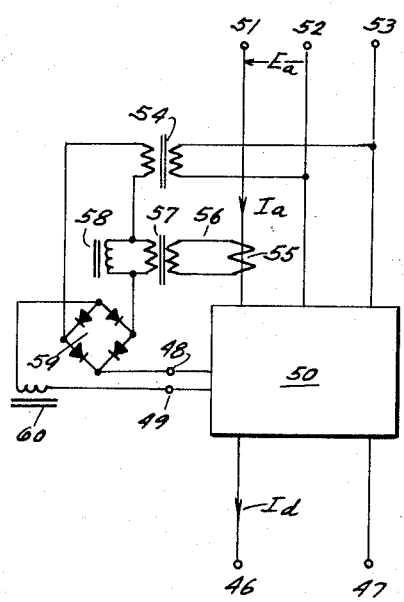
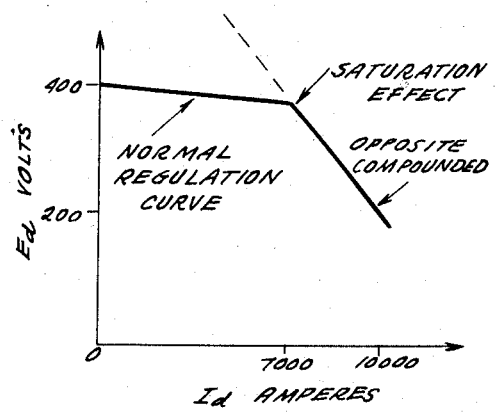
INVENTOR.
OTTO JENSEN
BY *Ostrolenk, Faber,*
*Gerb & Soffen*
ATTORNEYS March 1, 1960   O. JENSEN   2,927,143
MECHANICAL RECTIFIER FOR ARC FURNACE
Filed Sept. 18, 1957   3 Sheets-Sheet 3
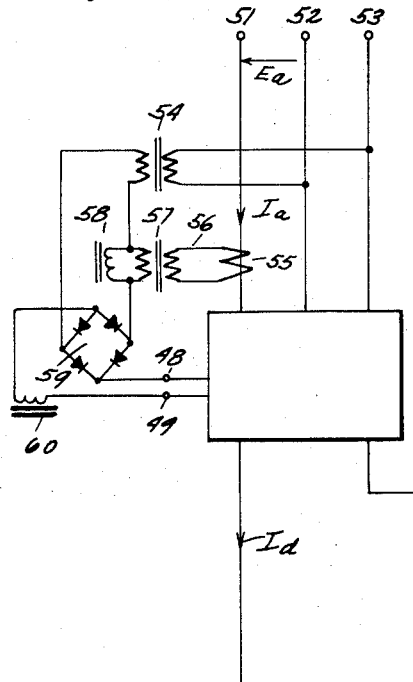
*FIG. 7*
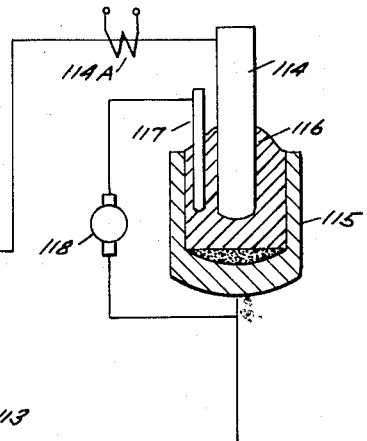
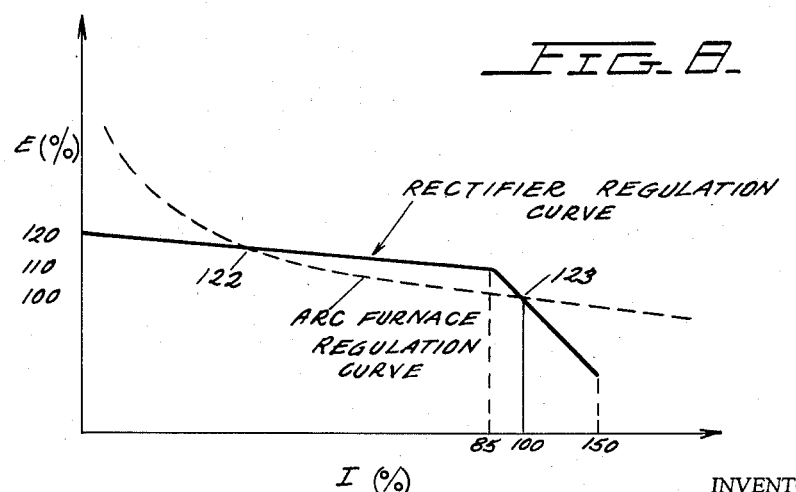
*FIG. 8*
INVENTOR.
OTTO JENSEN
BY Ostrolenk, Faber,
Gerb & Soffen
ATTORNEYS

United States Patent Office 2,927,143
Patented Mar. 1, 1960

2,927,143

MECHANICAL RECTIFIER FOR ARC FURNACE

Otto Jensen, Malvern, Pa., assignor to I-T-E Circuit Breaker Company, Philadelphia, Pa., a corporation of Pennsylvania Application September 18, 1957, Serial No. 684,701

3 Claims. (Cl. 13—12)

My invention relates to a compounded rectifier of the type set forth in copending application Serial No. 641,712, filed February 21, 1957, and assigned to the assignee of the instant invention for supplying energy to an arc furnace.

As is well known in the art, arc furnace loads require very high currents at low voltages. At the present time, welding generators are used to supply arc furnace power. However, welding generators for this function are exceedingly inefficient, and are heavy and expensive. For reasons to be set forth hereinafter, a rectifier such as a mechanical rectifier, or semi-conductor rectifier could not be used alone since, by itself, it could not start the arc, and if the arc is started by auxiliary equipment, the rectifier will operate in an unstable manner whereby the rectifier will be either short circuited or the arc will be extinguished.

Another problem in supplying energy to an arc furnace is that the arc voltage and current is subject to wide variations because of lumps of material to be melted in the furnace which may substantially short circuit the arc furnace for as long as two cycles.

The principle of my novel invention is to utilize a negatively or oppositely compounded rectifier which may have a large output choke for the energy supply of an arc furnace.

In this type of rectifier, the regulation characteristic decreases rapidly in the area of rated current of the arc furnace so that the output current change over a relatively wide output voltage range is relatively small. On the other hand, the arc furnace load line is such that the arc voltage decreases when the arc current increases. Accordingly, the arc current, when using an oppositely compounded rectifier, will stabilize the point where the load line of the arc furnace intersects the regulation characteristic of the rectifier. Thus, at currents lower than the desired rated current, the rectifier output voltage will be higher than the arc voltage to cause an increase in arc current, while at currents higher than the rated current, because of the rapid voltage decrease in the rectifier regulation characteristic, the rectifier voltage will be lower than the arc voltage to cause a decrease in arc current.

The use of the output choke in the rectifier output helps maintain a steady current, and further operates to supply a voltage surge to reignite the arc if the arc is extinguished.

Accordingly, the primary object of my invention is to provide a novel energy supply for an arc furnace.

Another object of my invention is to provide a rectifier having an oppositely compounded regulation characteristic for an arc furnace load.

A still further object of my invention is to provide a novel energy supply for an arc furnace which comprises a negatively compounded rectifier of the magnetic voltage control type in conjunction with a relatively large smoothing choke in the rectifier output.

These and other objects of my invention will become apparent from the following description taken in conjunction with the drawings in which:

Figure 1 shows a mechanical rectifier which utilizes a flux reversal circuit for output voltage control.

Figure 2 schematically represents the circuit of Figure 1 wherein rectification is achieved by any desired rectifier element and voltage regulation is achieved by a small control current.

Figure 4 shows the control characteristic for the rectifier of Figure 1.

Figure 5 shows an opposite compounding circuit for the device of Figure 2.

Figure 6 shows the regulation curve of the oppositely compounded rectifier of Figure 5.

Figure 7 schematically illustrates the rectifier of Figure 5 in conjunction with an output choke and an arc furnace load.

Figure 8 shows the regulation curves of both the rectifier supply and the arc furnace load of Figure 7.

Figure 1:
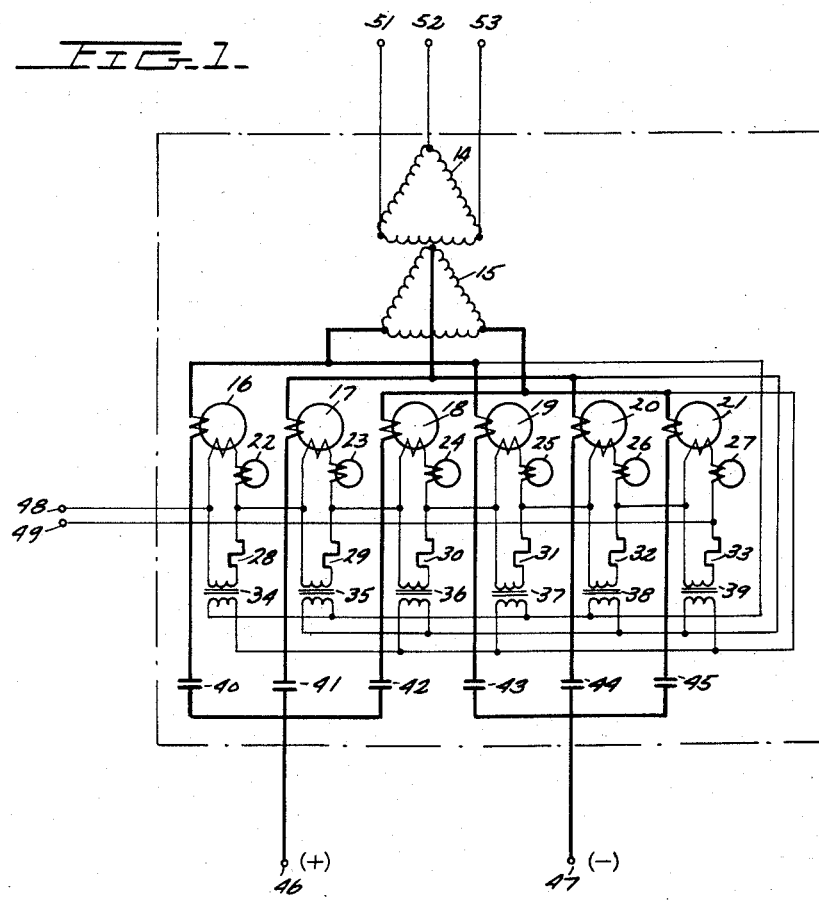

Figure 1 shows a mechanical rectifier utilizing flux reversal circuitry for control of the output voltage. This type of system is fully set forth in copending application Serial No. 486,243, filed February 4, 1955, now Patent 2,859,401, issued November 4, 1958, and assigned to the assignee of the instant invention and is herein made a part of the instant application.

The input terminals 51, 52 and 53 of Figure 1 are connectable to a three phase source of power and are connected to the primary winding 14 of the rectifier power transformer. The secondary winding 15 is then connected to the phases including commutating reactors 16, 17, 18, 19, 20 and 21 respectively. The contacts are synochronously driven into and out of engagement as set forth in copending application Serial No. 486,243, filed February 4, 1955, now Patent 2,859,401, issued November 4, 1958, and assigned to the assignee of the instant invention while the commutating reactors provide protective low current steps within which the contacts may operate.

The three positive phases including contacts 40, 41 and 42 are then combined at positive output terminal 46 while the three negative phases including contacts 43, 44 and 45 are combined at negative output terminal 47.

In order to control the degree of saturation of the commutating reactors 16 through 21 prior to closure of their respective contact, each of the reactors are provided with a flux reversal circuit including auxiliary saturable reactors 22, 23, 24, 25, 26 and 27 respectively, resistors 28, 29, 30, 31, 32 and 33 respectively, and A.-C. sources 34, 35, 36, 37, 38 and 39 respectively.

A D.-C. control source is then connected at control terminals 48 and 49 to control the flux reversal of the commutating reactors 16 through 21 whereby variation of control current from terminals 48 and 49 controls the output voltage appearing at terminals 46 and 47. Since the operation of this circuit is the subject matter of above noted application Serial No. 486,243, now Patent 2,859,401, issued November 4, 1958, it will not be further described herein. For purposes of the instant invention, it is only important to understand that an increase in flux reversal current from terminals 48 and 49 will increase output voltage while a decrease in output voltage will decrease output voltage. The rectifier, therefore, can be thought of as a generator of direct voltage, controlled by a small control current.

While the rectifier of Figure 1 is shown to be of the contact type, my invention is applicable to any type rectifier such as one utilizing metallic or semi-conductor rectifier units so long as magnetic control of the output voltage is utilized.

Figure 2:
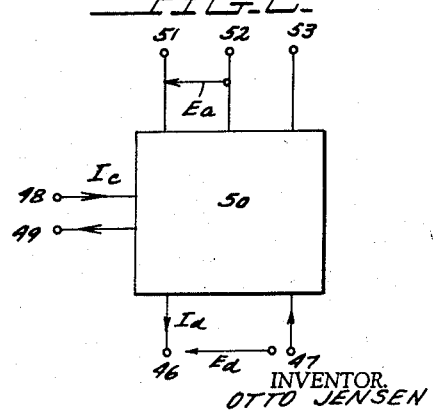

Thus the rectifier circuit of Figure 1 can be simplified for purposes of describing the instant invention to the form shown in Figure 2 where box 50 denotes any rectifier device such as that contained within the dotted lines of Figure 1 and a small control current from terminals 48 and 49 controls the output voltage at terminals 46 and 47.

In Figure 2, the input A.-C. phase voltage $E_a$ is to be a symmetric three phase voltage. The output voltage $E_d$ is a direct voltage produced by rectifier 50 and the output direct current is identified as $I_d$. A control current $I_c$ is applied to the rectifier from terminals 48 and 49.

Figure 3:
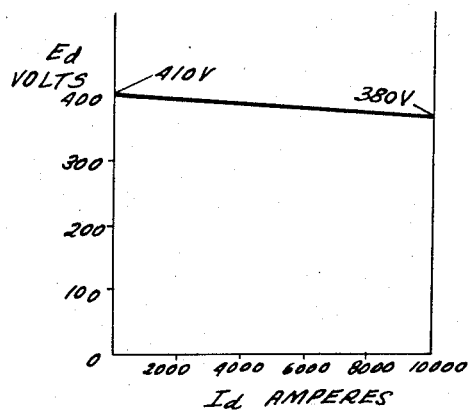
Figure 3 shows the regulation curve for the rectifier device of Figure 1.

Two characteristics of the device of Figure 2 are now assumed; first, the natural regulation curve of Figure 3 and; secondly, the control characteristic of Figure 4, each of these curves carrying values typical of high power rectifier devices for purposes of illustration.

The regulation curve of Figure 3 is typically a straight line having a downward slope and having an output voltage of 410 volts at zero current and 380 volts at 10,000 amperes. As will be seen hereinafter, the compounding circuit exercises control over this characteristic.

The control characteristic of Figure 4 is similar to the control characteristic of many magnetic amplifiers, and for most purposes can be replaced by the straight line characteristic shown in the dotted line.

The compounding circuit set forth in Figure 5 is shown as applied to the system of Figure 2, and comprises the current transformer 55 connected in the input conductor of the rectifier, the potential transformer 57 having its primary winding connected to current transformer 55 and its secondary winding connected across reactor 58, and potential transformer 54 having its primary winding connected to the rectifier phase voltage.

The secondary voltages of transformers 54 and 57 are then connected in opposition to one another and their net voltage is rectified by rectifier 59 and applied to terminals 48 and 49 through the choke 60.

The operation of the circuit of Figure 5 may now be given in conjunction with the regulation characteristic of Figure 6 which show the opposite compounding achieved by the circuit of Figure 5.

If the rectifier is running at a low current within the normal regulation curve range of Figure 6, then the relatively low voltage induced on choke 58 does not sufficiently oppose the voltage on the secondary winding of transformer 54 to decrease the control current flowing through choke 60 to a low enough value to achieve control of the output voltage (see Figure 4). When, however, this point is reached, an increase of load current will cause the control current through choke 60 to decrease within the range where a further decrease in control current achieves a decrease in the output voltage. Accordingly, in the relatively high load current range, the current varies by a relatively small amount for a large variation in output voltage as seen by the opposite compounded portion of Figure 6.

The essence of my novel invention is to apply the rectifier of Figure 5 to an arc furnace type of load. This novel combination which further includes a smoothing choke is set forth in Figure 7 which shows the arc furnace in a cross-sectional view.

More specifically, Figure 7 shows the choke 113 connected in the output of the rectifier of Figure 5 and in series with the main electrode 114, and the housing 115 of an arc furnace. The material 116 to be melted is contained within the housing 115, and an auxiliary, or starting electrode 117 is also provided therein. The auxiliary electrode 117 is then connected in series with a small welding generator 118 and the housing 115.

The operation of the furnace is started by starting the small auxiliary welding generator 18 which generates an arc between the electrode 117 and the bottom of housing 115. At this time, the mechanical rectifier is running under no load condition. When an arc has been started from the electrode 117, the voltage of the furnace drops and a current starts flowing from electrode 114 which immediately leads to an unstable condition, causing a very large current through the electrode 114, whereupon the welding generator 118 is stopped by any type of overcurrent sensing device such as the current transformer 114A which is connected to the welding generator 118 in any desired manner.

The load smoothing choke 113 maintains the load current constant, and supplies an additional voltage impulse necessary to keep the arc alive if the furnace tends to go out. In this case, the high inductance of choke 113 provides such a high additional voltage that the arc restrikes.

The regulation curve of the arc furnace is shown in dotted lines in Figure 8 and the rectifier regulation curve which is the same as the curve shown in Figure 6 is also repeated in Figure 8, the voltage and current scales being given in percentage of rated value. If the current through the main electrode 14 decreases below the value given by point 122 of Figure 8, the arc goes out and must be restruck by the welding generator 18 and the auxiliary electrode 117. Whenever the current (expressed in percent in Figure 8), stays above point 122 which is approximately 30% of rated current, the arc tends to stabilize itself around point 123 or slightly below, because between points 122 and 123, the voltage of the rectifier is higher than the voltage of the arc and thus tends to increase the current, and beyond point 123, the voltage of the rectifier is lower than the voltage of the arc and tends to decrease the current. Thus the burning point is stabilized around point 123, which is approximately 100% of the load current of the rectifier.

When a sudden disturbance in the melt 116 decreases the voltage across the arc furnace, the current increases up to 100% of the rated value with the rectifier output voltage decreasing proportionately. This increase in current is slowed down by the choke 113 which requires a substantial voltage to increase its current, and will hold the rate of change of current at low value. When the arc voltage suddenly jumps back to a high value, the current cannot decrease rapidly, of if it is forced to decrease, the voltage across the choke increases rapidly and supplies sufficient voltage across the furnace to keep the arc burning. The smoothing choke 113, therefore, has the effect of keeping the arc burning at a constant current and adds to the stabilizing effect of the drooping characteristic of the rectifier.

In the foregoing, I have described my invention only in connection with preferred embodiments thereof. Many variations and modifications of the principles of my invention within the scope of the description herein are obvious. Accordingly, I prefer to be bound not by the specific disclosure herein but only by the appending claims.

I claim:

1. The combination of a rectifier system energizable from an A.-C. source, and an arc furnace; said arc furnace comprising a container for receiving material and a main electrode; said rectifier system comprising the connection of a rectifying element in series with a saturable type reactor, said rectifier system being connected in series with said main electrode and said container; a compounding circuit for controlling the regulation curve of said rectifier system and a control winding on said saturable type reactor; said compounding circuit being connected to said control winding and including a source of voltage which is varied responsive to variations in the current through said main electrode; said voltage applied to said control winding being altered in such manner as to cause at least a portion of the regulation characteristic of said rectifier to have a relatively small output current change for a relatively large output voltage change.

2. The combination of a rectifier system energizable from a A.-C. source, and an arc furnace; said arc furnace comprising a container for receiving material and a main electrode; said rectifier system comprising the connection of a rectifying element in series with a saturable type reactor, said rectifier system being connected in series with said main electrode and said container; a compounding circuit for controlling the regulation curve of said rectifier system and a control winding on said saturable type reactor; said compounding circuit being connected to said control winding and including a source of voltage which is varied responsive to variations in the current through said main electrode; said voltage applied to said control winding being altered in such a manner as to cause at least a portion of the regulation characteristic of said rectifier to have a relatively small output current change for a relatively large output voltage change; a D.-C. choke; said D.-C. choke being connected in series with said rectifier system and said arc furnace.

3. The combination of a rectifier system energizable from an A.-C. source, and an arc furnace; said arc furnace comprising a container for receiving material and a main electrode; said rectifier system comprising the connection of a rectifying element in series with a saturable type reactor, said rectifier system being connected in series with said main electrode and said container; a compounding circuit for controlling the regulation curve of said rectifier system and a control winding on said saturable type reactor; said compounding circuit being connected to said control winding and including a source of voltage which is varied responsive to variations in the current through said main electrode; said voltage applied to said control winding being alterable to cause at least a portion of the regulation characteristic of said rectifier to have a relative small output current change for a relatively large output voltage change; said arc furnace having an auxiliary electrode connectible to a source of energy for initiating an arc to said container.

References Cited in the file of this patent

UNITED STATES PATENTS

| 1,994,907 | Dawson | Mar. 19, 1935 |
| 2,790,127 | Hamilton | Apr. 23, 1957 |

FOREIGN PATENTS

| 312,780 | Switzerland | Apr. 14, 1956 |